United States Patent
Nikkilä et al.

(10) Patent No.: US 8,746,744 B2
(45) Date of Patent: Jun. 10, 2014

(54) IDENTIFICATION DOCUMENT COMPRISING A SECURITY PATTERN

(75) Inventors: Jarmo Nikkilä, Meudon (FR); Teemu Pohjola, Meudon (FR)

(73) Assignee: Gemalto Oy, Vantaa (FI)

( * ) Notice: Subject to any disclaimer, the term of this patent is extended or adjusted under 35 U.S.C. 154(b) by 180 days.

(21) Appl. No.: 13/119,024

(22) PCT Filed: Sep. 17, 2009

(86) PCT No.: PCT/IB2009/054081
§ 371 (c)(1),
(2), (4) Date: May 5, 2011

(87) PCT Pub. No.: WO2010/032208
PCT Pub. Date: Mar. 25, 2010

(65) Prior Publication Data
US 2012/0091704 A1    Apr. 19, 2012

(30) Foreign Application Priority Data

Sep. 18, 2008 (EP) .................................. 08164556

(51) Int. Cl.
*B42D 15/00* (2006.01)
*G06K 19/06* (2006.01)

(52) U.S. Cl.
USPC .............................. 283/92; 283/85; 235/491

(58) Field of Classification Search
USPC ....................... 283/85, 92; 235/491
See application file for complete search history.

(56) References Cited

U.S. PATENT DOCUMENTS

| | | | | |
|---|---|---|---|---|
| 6,076,859 A * | 6/2000 | Hall et al. | | 283/89 |
| 6,082,778 A * | 7/2000 | Solmsdorf | | 283/85 |
| 6,471,248 B2 * | 10/2002 | Hardwick et al. | | 283/82 |
| 6,474,695 B1 * | 11/2002 | Schneider et al. | | 283/92 |
| 6,508,489 B2 | 1/2003 | Herrmann et al. | | |
| 6,616,190 B1 * | 9/2003 | Jotcham | | 283/72 |
| 6,786,513 B1 * | 9/2004 | Cobben et al. | | 283/72 |
| 6,953,206 B1 * | 10/2005 | Dilz et al. | | 283/85 |
| 7,758,079 B2 | 7/2010 | Beyer-Meklenburg et al. | | |
| 2006/0097513 A1 * | 5/2006 | Caldwell | | 283/72 |

(Continued)

FOREIGN PATENT DOCUMENTS

| | | |
|---|---|---|
| DE | 102004055495 A1 | 5/2006 |
| EP | 0936975 A1 | 8/1999 |

(Continued)

OTHER PUBLICATIONS

Office Action issued Sep. 5, 2011 in EP Application No. 09740957.

(Continued)

*Primary Examiner* — Kyle Grabowski
(74) *Attorney, Agent, or Firm* — Panitch Schwarze Belisario & Nadel LLP

(57) ABSTRACT

The invention relates to an enhanced security feature for identification document. For that, the identification document comprises at least two constitution layers, a first specific coating (15) inside the document, between two constitution layers, said coating being able to be revealed under predetermined lighting conditions. It comprises also an assembly of micro-holes (16) provided through at least one of the layers, in order to make possible the revelation of the first specific coating under said predetermined conditions, said assembly of micro-holes, together with said coating to be revealed through micro-holes, drawing said security pattern.

9 Claims, 4 Drawing Sheets

(56) References Cited

U.S. PATENT DOCUMENTS

| | | |
|---|---|---|
| 2007/0087173 A1 | 4/2007 | Endres et al. |
| 2008/0250954 A1* | 10/2008 | Depta et al. .................. 283/85 |
| 2010/0270380 A1 | 10/2010 | Komarek et al. |

FOREIGN PATENT DOCUMENTS

| | | |
|---|---|---|
| EP | 0723501 B2 | 5/2005 |
| EP | 1602782 A2 | 12/2005 |
| EP | 1798026 A1 | 6/2007 |
| JP | 2003226085 A | 8/2003 |
| JP | 2006224476 A | 8/2006 |
| WO | 2005048182 A1 | 5/2005 |
| WO | 2006066803 A1 | 6/2006 |
| WO | 2006128607 A2 | 12/2006 |
| WO | 2008145381 A1 | 12/2008 |

OTHER PUBLICATIONS

Int'l Search Report issued on Dec. 29, 2009 in Int'l Application No. PCT/IB2009/054081; Written Opinion.

* cited by examiner

IDENTIFICATION DOCUMENT COMPRISING A SECURITY PATTERN

CROSS-REFERENCE TO RELATED APPLICATION

This application is a Section 371 of International Application No. PCT/IB2009/054081, filed Sep. 17, 2009, which was published in the English language on Mar. 25, 2010, under International Publication No. WO 2010/032208 A1, and the disclosure of which is incorporated herein by reference.

BACKGROUND

This invention relates generally to identification documents and a method for making such identification documents. More particularly, this invention relates to a secure identification document that allows detecting a fraudulent modification of the existing personalization or a completely falsified document. The invention also relates to a method for making such a document.

Identification documents, such as driving licenses, identity cards, membership cards, badges or passes, passports, discount cards, banking cards, money cards, multi-application cards, and other papers of value; and security documents such as bank notes are widely used. Because of the value and importance associated with each of these data carriers, they are often the subject of unauthorized copying and alterations, and forgeries.

To prevent such activities from being carried out on these data carriers, different types of visual and touchable security features have been added to data carriers. One of these security features consists in providing, into the document, an optically variable security element, which comprises at least two security markings. Said markings are decomposed and interleaved, so as to create a complex image that is printed into the document. Then, a filter is placed over this complex image, said filter being arranged so that it enables to visualize each marking at a respective particular angle by tilting the document.

Another security feature consists in providing a personalized image that is perforated through a document, but not extending through the whole thickness of the document. For that, blind holes are perforated, and the desired brightness tones are obtained by varying the density and/or the diameter and/or the depth of these holes. This technology is for example described in the document EP0936975.

Still another security feature consists in applying specific inks, such as UV inks, or IR inks for instance, onto the top surface of the data carrier, so that a security pattern can be revealed under predetermined lightening conditions. However, because they are applied onto the external surface of the document, such inks suffer from the environmental stresses. Therefore, the use of such inks onto the surface of identification documents is not compliant with a long-term life, which is required for identification documents that are usually delivered for ten years. On the other hand, some of these inks, namely short-wavelength UV inks, are generally absorbed, more or less, by plastic layers, depending on their thickness. That's the reason why such inks are not used inside identification document, because they cannot be sufficiently seen through the plastic constitution layers, whatever they are transparent or opaque.

Considering the above, a problem intended to be solved by the invention is to improve the existing solutions, and to find alternative solution to existing security features for identification documents comprising at least two constitution layers. Said identification document is personalized with personalization data and is secured with a security pattern, which forms the security feature. The problem is to use any inks to make the security pattern, said inks being able to be revealed under predetermined specific conditions, said inks being applied inside the constitution layers and no more onto the external surface of a document, in order to protect them against environmental stresses, and able to be selectively revealed in spite of the layers placed above that may either hidden or greatly soften their appearance.

Another problem intended to be solved by the invention is to provide a method for manufacturing a secure identification document comprising at least two constitution layers, said document being personalized with personalization data and being secured with a security pattern, said method being easy, quick to implement, and of low cost.

SUMMARY

The solution of the invention to the first problem relates to the fact that the identification document comprises a first layer of specific coating inside the document, between two constitution layers, said coating being able to be revealed under predetermined lighting conditions, and an assembly of micro-holes provided through at least one of the layers, in order to make possible the revelation of the first specific coating under said predetermined conditions, said assembly of micro-holes together with said coating to be revealed through micro-holes, drawing said security pattern.

Thus, micro-holes are provided in order to remove the material hiding the specific coating, so as to make it possible to be revealed. Micro-holes are provided in such a manner that they draw a security pattern, which is revealed by the specific coating when enlightened under the predetermined conditions.

According to another aspect of the invention, there is provided a method for manufacturing a secure identification document comprising at least two constitution layers and being personalized with personalization data and being secured with a security pattern, said method comprising the following steps: providing, between two constitution layers, a first layer of specific coating, able to be revealed under predetermined lighting conditions, laminating together said two constitution layers and specific coating layer, providing micro-holes through at least one of the layers, in order to make possible to reveal first specific coating, said first specific coating to be revealed through said micro-holes forming an assembly that draws the security pattern.

The assembly of micro-holes may be made either at the last stage of the manufacturing, substantially simultaneously to the personalization step, or before the attachment of the layers to each other.

BRIEF DESCRIPTION OF DRAWINGS

The invention will be better understood with reference to the drawings, in which.

DETAILED DESCRIPTION

Hereafter, embodiments of the present invention will be described in the context of identity (ID) card and a method for producing it. However, it is to be understood that the invention is usable with any data carrier that includes, but is not limited to, a driving license, a badge or pass, a booklet passport, a discount card, a membership card, a banking card, a credit card, a money card, a multi-application card, tickets, tax stamps, passes and other security documents and papers of value that are to be provided with information or data in such a way that they cannot be easily imitated by common means. Such document can be made with different appearance, such as card or booklet for instance.

Figure 1A:
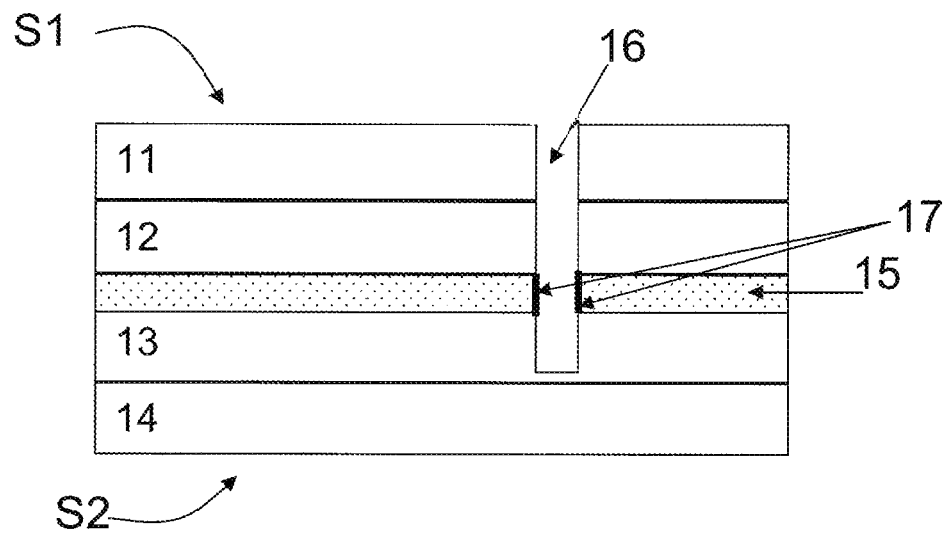
FIGS. 1A and 1B, are schematic cross-sectional views of examples of identification document according a first embodiment of the invention.
Figure 1B:
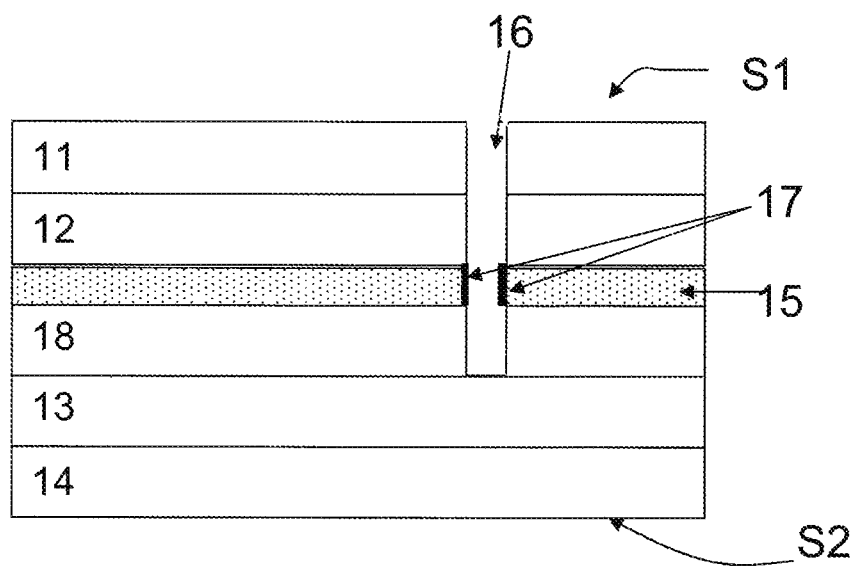

FIGS. 1A and 1B show cross-sectional views of an ID card comprising several constitution layers 11, 12, 13, 14, 18 made in either paper, or cardboard, or textile or polymer. Amongst the polymers that can be used in the composition of the card body, the material can be, but is not limited to, a Polyvinyl-chloride (PVC), and/or Polyethylate terephtalate (PET), and/or Acrylonitrile Butadiene styrene (ABS), and/or Polycarbonate (PC) etc. . . . . . The wording "constitution layers" used in the present description must be understood as all types of layers, including also substrates, that are used for manufacturing the body of the document. All the layers 11, 12, 13, 14 and 18 are assembled together by means of lamination technology for example. In a well-working example, the layers are made in polycarbonate and they are laminated so that, during lamination step, they are fused together in such a manner that they form only one piece and they cannot be peeled anymore.

The ID card comprises another layer 15 of specific material that is placed inside the card body, between at least two constitution layers 12, 13, 18, and that is completely hidden and not visible when looking at the card from the both sides. For having such hidden specific material, either the specific material used is a material that is not visible through other layers such as short-wavelength UV ink (typically around 300 nm or shorter), which is absorbed by plastic material, or the specific material is hidden by opaque layers or relatively thick at least translucent layers. Then, at one of the latest steps of the manufacturing of the card, i.e. at the personalization step for instance, this material can be revealed at specific areas, so as to create a security pattern. The specific coating 15 can be, but is not limited to, a fluorescent or bi-fluorescent ink, such as UV ink that reacts with a wavelength at either 302 nm or 254 nm for example, or a thermochromatic ink, or a circularly polarized ink or an IR ink etc. . . . . . In the case of bi-fluorescent UV ink, for example, such ink is more or less filtered by upper plastic layers, whatever they are opaque or translucent, so that the ink is either completely hidden or its appearance is at least greatly reduced. In order to be sure that the ink is completely hidden, it can be placed between two opaque layers 12 and 13 (see FIG. 1A), or onto one of the surfaces of an at least translucent layer 18 placed between two opaque layers 12, 13 (see FIG. 1B).

Then, a security pattern can be made substantially simultaneously to the graphic personalization step. The personalization step consists in providing on the card, all the personalization data concerning the card owner. These data comprise for example the photograph of the owner, and information such as his name, address, birth date, and all other personal information. The personalization step is made using conventional techniques such as laser engraving or printing for example. The personalization data are either laser engraved into the layer 12 or printed onto the surface of the layer 12, and then protected against environmental stresses by a transparent layer 11, also called "overlay". At substantially the same time, micro holes are provided through at least one of the layers of the card. In the example of FIGS. 1A and 1B, the micro holes 16 are provided through several layers 11, 12, 13, 18, 15 including the ink layer 15. These micro-holes can be made using all known technologies such as laser ablation, etching, engraving, punching, or drilling, etc. They can be provided through the whole thickness of the card or not. However, the obtained visual effect is a bit lower with holes provided through the whole thickness than with holes provided through some layers. In a variant of implementation, which will be detailed later, they can also be provided through at least one layer inside the document, and not through the upper external layers.

Thus, in examples illustrated on FIGS. 1A and 1B, micro-holes being provided through the ink layer 15, they enable to reveal the ink in areas 17 just around the holes. This ink is seen from the holes 16. Thus, by providing several micro-holes, at specific locations, it is possible to draw a security pattern. In the example of a bi-fluorescent ink that reacts at 365 and 254 nm, the wavelength at 254 nm can only be revealed through the holes and is hidden otherwise, while the other wavelength at 365 nm can also appearing through an upper at least translucent plastic layer, if it is not to thick. The security pattern can be for example a ghost image of the photograph or it can reveal the contour of a photograph or a text, so that it is impossible to change the latter. Then the ink, which is thus revealed, can be seen from either both sides S1 or S2 with different appearance (i.e. ink will be more or less visible) depending on the lighting conditions, and more particularly depending on which side it is enlightened and from which side it is looked at.

Depending on the material used for the specific layer 15 to be revealed, the lighting material will be for example an UV lamp, or an IR lamp, or a polarized light etc. . . . . .

The diameter of micro-holes is preferably less than 2 mm. Depending on the material used for the constitution layers and on the thickness of the constitution layers, they can be made either before or after the lamination step, in case where the layers are attached together by using this technology. In fact, if layers are made in polycarbonate, micro-holes can be made before the lamination step only if layers to be laminated have thickness less than 0.05 μm, otherwise the polycarbonate constituting the layers will smear and fill the micro-holes. Consequently, if the thicknesses of the polycarbonate layers are more than 0.05 μm, micro-holes are preferably made after lamination step. This constraint on pre-perforated layers to be laminated is only relevant for polycarbonate material, which is assembled by lamination. Indeed, if layers are made with other plastic material, such as PVC, ABS, PET for example, these layers are typically assembled using adhesives, in which case there is no strict upper limit for the thickness of pre-perforated layers.

With such document, if an attempt is made to peel the constitutions layers, for example layers 12, and 13 in FIG. 1A, it is then impossible for the forger to replace the layers in such a manner that the micro-holes of each layer face exactly each other, so that ink 15 is either no more revealed in areas 17 because hidden, or its revelation is considerably reduced. Consequently, such an attempt appears directly to naked eye.

Figure 2:
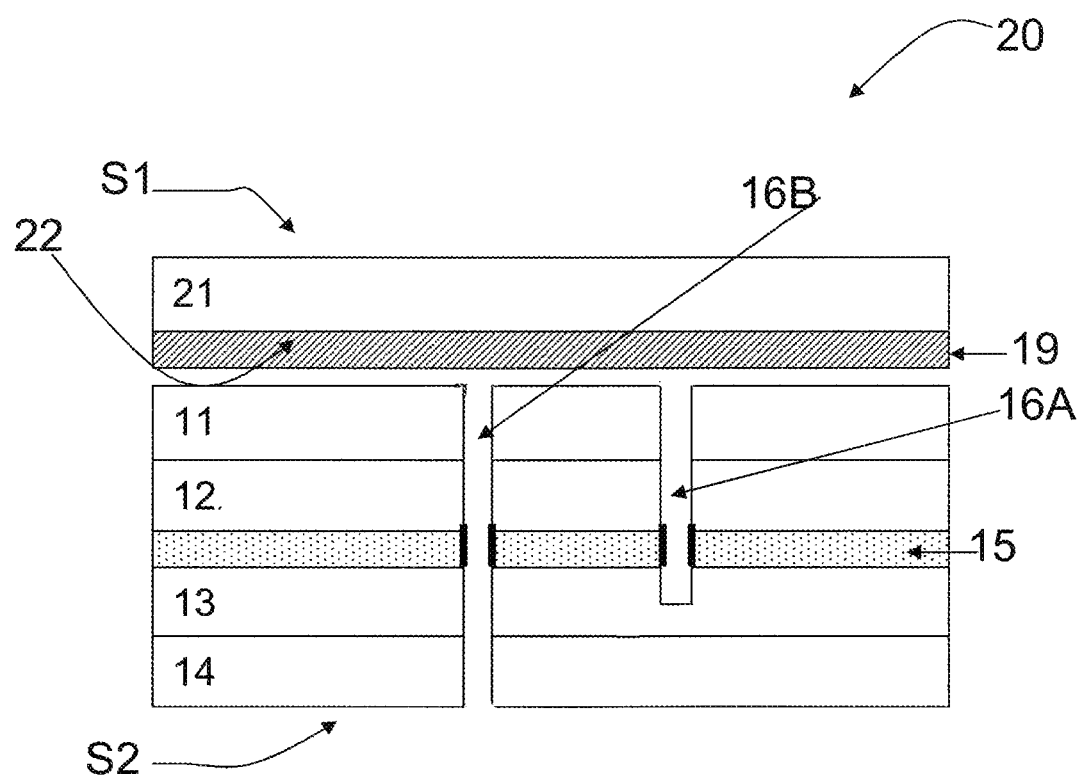
FIG. 2, is a cross-sectional view of an identification document according to a second embodiment of the invention.

FIG. 2 shows an even more secure embodiment. In this embodiment, after personalization step and after having providing the micro-holes 16A, 16B to reveal the ink 15 in areas 17 surrounding the holes, an additional and final step consists in attaching, for example by lamination, another layer 21 of an at least translucent plastic. The inner surface 22 of this layer 21 is covered by a specific material 19, which is opaque at normal stage and which becomes invisible under specific circumstances. This specific material can be, but is not limited to, a thermochromatic ink, which is black at normal stage and becomes invisible when it is warmed to a specific temperature. The phase transition temperature of such an ink can be reached for example by a simple pressure of a finger. Another example of such a specific material 19 can be an ink sold by the security printing ink producer SICPA and known under the trademark name "Oasis" (for "Optically Active Secure Ink System"). This specific ink is opaque and hide the underneath layers, and it becomes invisible, when viewed through a polarization filter, and reveals the layers and the holes underneath, so as to show the fluorescent ink in the holes areas that draws the security pattern. Such embodiment using a specific material 19 which is opaque at normal conditions and becomes invisible under predetermined conditions, so as to reveal the layers, micro-holes 16, and specific coating or ink 15 underneath through the micro-holes 16, is very secure and enables to reveal the security pattern underneath in order to authenticate the ID document.

Figure 3:
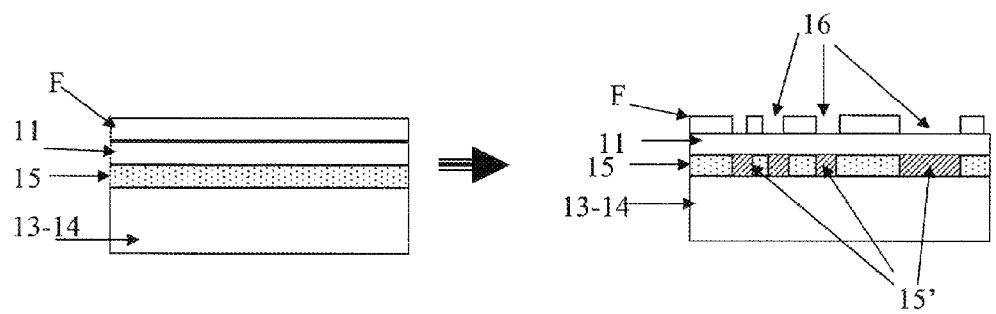
FIGS. 3 to 7 are cross-sectional views of an identification document according to other embodiments of the invention.
Figure 4:
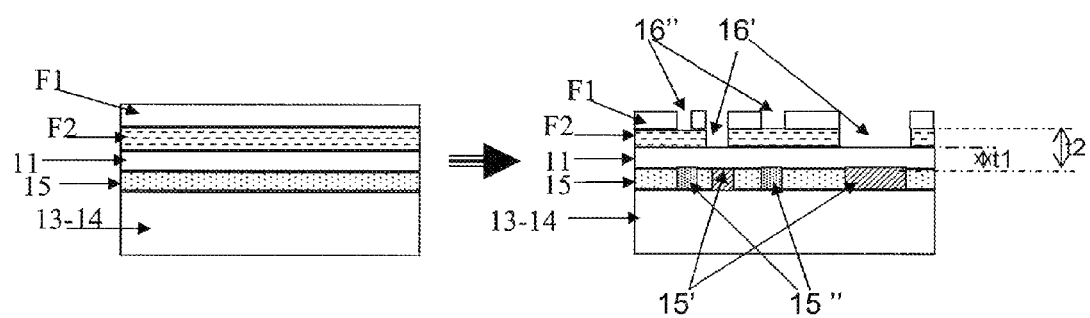
Figure 5:
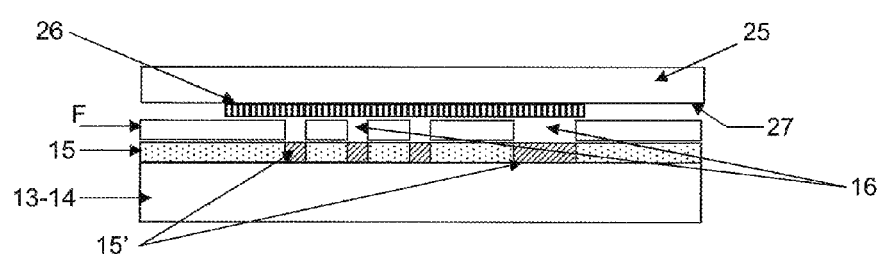

FIGS. 3 to 5 show other embodiments. In these embodiments, micro-holes are provided through layer(s) located above the layer 15 of specific coating or ink, but they are not made through this layer. Consequently, in order to be at least visible, this specific ink, for example an UV ink, must be covered at the most by a thin layer 11 at least translucent, so that it is not completely hidden. The ID document is manufactured by assembling all the layers 11-14 together including the layer of specific ink 15, by using conventional technology. In order to further reveal the layer 15, it must be seen through the remaining layer(s) located above (the layer 11 in example of FIG. 3). Consequently, layer 11 must be made in a material at least translucent and at the most transparent and with a relatively thin thickness.

Then the thus obtained body of the document is graphically personalized. This personalization can be made either by laser engraving the layer 11, if this layer is made with a material that is laser sensitive; or by printing the personalization data onto the surface of the layer 11, by using a conventional printing technology.

In an additional step, a layer F is attached to the body. This layer, named filter in the following description, is made in a material that hide the underneath ink layer 15, but not the personalized information. This filter layer does not hide anything else but the material 15 intended to be selectively revealed afterwards, at the final step of the manufacturing process. Consequently, normal personalization such as the photograph of the owner, or other alphanumeric data about his identity is normally visible in all cases. The last step then consists in providing micro-holes that are made through the filter layer thickness. These holes enable to reveal the material 15 located underneath, at locations 15' under the holes 16, through the at least translucent layer 11, so that a security pattern can be drawn.

As it is described above, the specific material 15 intended to be revealed at the final stage of the manufacturing process, can be made of, but is not limited to, fluorescent ink or bifluorescent ink, IR ink, a metal foil, oasis ink from Sicpa, etc. . . . depending on the type of material used, it can be seen under predetermined condition, for example by enlighten it with an UV lamp at a specific wavelength, IR lamp, circularly polarized light etc. . . . .

The filter material can be made of different material, for example of an at least translucent plastic layer, such as PVC, PET, PC etc. . . . , with a thickness thick enough to hide the underneath layer 15, or a polarizing filter etc. . . . .

In a variant, the holes are made directly into the protective layer, or overlay 11, that is made of a suitably filtering material, thick enough polycarbonate for instance, either before or after it is applied onto the ID document.

FIG. 4 shows another variant of this embodiment, in which two filter layers F1 and F2 are used. Thus, the filtering strength being proportional to the thicknesses t1 or t2 of the remaining material above, the visibility of the layer 15 is only gradually reduced in areas 15' and 15", depending on the values of the small thicknesses t1 or t2 of the plastic material remaining above the ink layer 15. With this variant, it is possible to achieve different shades instead of just binary marking.

Furthermore, in case a protective layer 25 is attached on top of the body, it can have another type of filter on/in it to enable to hide and/or reveal the underlying markings. This is illustrated on FIG. 5, where the protective layer 25 holds a special ink 26 onto its lower surface 27 located against the personalized surface and the holes 16. Such ink 26 can be used to achieve yet other effects and in particular hide and reveal the micro-holes 16 and thus the revealed ink 15' that draws a security pattern.

The special ink 26, may be choose, but is not limited to, amongst either a thermochromatic ink, to hide the markings and have them revealed when heating/warming the ink with one's finger tips; or Oasis ink from Sicpa or others.

Figure 6:
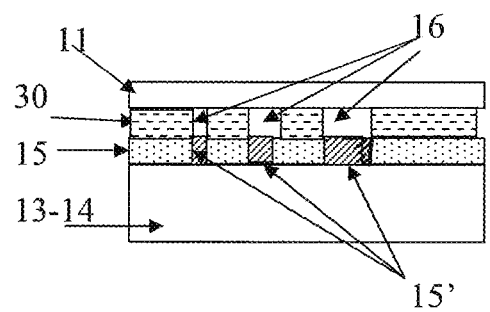

FIG. 6 shows another variant, in which the holes are obtained by laser ablation through another specific layer 30. In this example, layers 13-14 form a substrate on which is printed the first specific coating 15 to be revealed. Then, a metal foil 30, which can be holographic or not, is placed directly onto the first coating 15 and covered by at least one upper layer 11. A laser beam is used to create the holes 16 into the thickness of the metallic foil in order to reveal the ink 15 underneath, at locations 15', but not through the upper layer(s) 11. In a particularly interesting embodiment, the metal foil used is a metallic holographic foil and once perforated it becomes unique to the document and its holder and thereafter cannot be used for counterfeiting any other documents.

Figure 7:
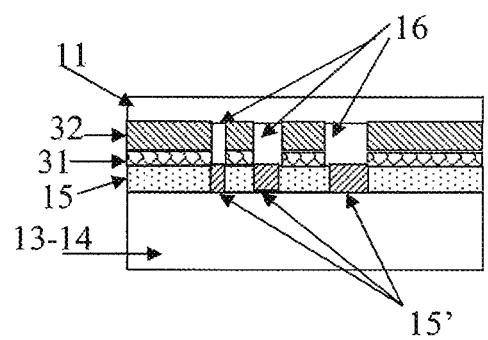

FIG. 7 shows still another variant, according to which the specific coating 15 is covered by a laser-sensitive varnish 31, itself printed with another specific coating or ink 32 designed to hide the first ink 15. Then the varnish 31 reacts to laser beam, so that the second ink 32 can be selectively removed, thus revealing the first ink 15, at locations 15', without holes creation through the upper layer(s) 11.

The invention claimed is:

1. An identification document personalized with personalization data and secured with a security pattern, the identification document comprising
    at least two constitution layers,
    a first layer of specific coating provided between the at least two constitution layers and hidden inside the document, said first layer of specific coating being a fluorescent ink, an UV ink or an IR ink which is revealed under predetermined lighting conditions,
    an assembly of micro-holes provided through at least one of the at least two constitution layers and through the first layer of specific coating, said first layer of specific coating being revealed through said assembly of micro-holes under said predetermined lighting conditions, thereby creating said security pattern,
    at least one upper layer placed above one of the at least two constitution layers and the first layer of specific coating, the least one upper layer being an outermost perforated layer, and
    at least one protective layer placed on top of the outermost perforated upper layer to protect the micro-holes, wherein an inner surface of the protective layer holds an additional layer of specific ink, said additional layer of specific ink being opaque, such that the layers underneath are hidden but become invisible under predetermined conditions, so as to reveal the micro-holes and the layers underneath, through the revealed micro-holes.

2. The identification document according to claim 1, wherein the assembly of micro-holes is provided through the at least one upper layer to reveal the first layer of specific coating underneath at specific locations under said micro-holes.

3. The identification document according to claim 1, wherein the at least one upper layer is either a layer of filtering material, a metal foil, or a second layer of specific coating applied on a varnish covering the first specific coating.

4. The identification document according to claim 1, wherein the first layer of specific coating is surrounded by at least two constitution layers that are opaque.

5. The identification document according to claim 1, wherein the identification document is in the form of either a card or a booklet.

6. A method for manufacturing a secure identification document comprising at least two constitution layers, said identification document being personalized with personalization data and being secured with a security pattern, said method comprising:

providing a first layer of specific coating between at least two constitution layers such that the first layer of specific coating is hidden inside the document, said first layer of specific coating being a fluorescent ink, an UV ink or an IR ink which is revealed under predetermined lighting condition, laminating said at least two constitution layers and said first layer of specific coating together, providing micro-holes through at least one of the at least two constitution layers and through the first layer of specific coating, said first layer of specific coating being revealed through said micro-holes under said predetermined lighting conditions, thereby creating the security pattern, wherein the micro-holes are provided through at least one of the at least two constitution layers and through the first layer of specific coating before the step of laminating said at least two constitution layers and said first layer of specific coating together.

7. The method according to claim 6, wherein the step of providing the micro-holes is performed substantially simultaneously to a personalization step.

8. The method according to claim 7, wherein the micro-holes are provided by laser ablation inside the document, through additional upper layers that remain untouched.

9. The method according to claim 6, wherein the micro-holes are provided by laser engraving, by drilling, or by punching.

* * * * *